United States Patent [19]
Carter, Jr.

[11] Patent Number: 5,727,754
[45] Date of Patent: Mar. 17, 1998

[54] GYROPLANE

[75] Inventor: Jay W. Carter, Jr., Burkburnett, Tex.

[73] Assignee: CarterCopters, L.L.C., Wichita Falls, Tex.

[21] Appl. No.: 521,690

[22] Filed: Aug. 31, 1995

[51] Int. Cl.$^6$ ............................................. B64C 27/02
[52] U.S. Cl. ............................. 244/8; 244/75 R; 244/17.11
[58] Field of Search ............................. 244/4 R, 6, 7 R, 244/17.11, 8

[56] References Cited

U.S. PATENT DOCUMENTS

| | | | |
|---|---|---|---|
| D. 172,712 | 7/1954 | Gebhard | D12/335 |
| D. 178,598 | 8/1956 | Fletcher | D12/327 |
| D. 209,252 | 11/1967 | Foote | D12/327 |
| D. 239,522 | 4/1976 | Wheatley | D12/335 |
| 2,068,616 | 1/1937 | Wilford | 244/8 |
| 2,698,147 | 12/1954 | Hovgard . | |
| 2,699,299 | 1/1955 | Herrick . | |
| 2,879,013 | 3/1959 | Herrick . | |
| 3,138,349 | 6/1964 | Piasecki . | |
| 3,155,341 | 11/1964 | Girard . | |
| 3,241,791 | 3/1966 | Piasecki . | |
| 3,332,643 | 7/1967 | Toner . | |
| 3,409,248 | 11/1968 | Bryan . | |
| 3,448,946 | 6/1969 | Nagatsu . | |
| 3,563,496 | 2/1971 | Zuck . | |
| 4,195,800 | 4/1980 | Wallace . | |
| 4,366,387 | 12/1982 | Carter, Jr. et al. . | |
| 4,409,050 | 10/1983 | Carter, Jr. et al. . | |
| 4,928,907 | 5/1990 | Zuck . | |
| 5,301,900 | 4/1994 | Groen et al. | 244/17.25 |
| 5,462,409 | 10/1995 | Frengley et al. | 416/144 |

*Primary Examiner*—Galen L. Barefoot
*Attorney, Agent, or Firm*—Felsman, Bradley, Gunter & Dillon, LLP

[57] ABSTRACT

An improved gyroplane having an improved rotor blade with an edgewise stiffness (EI) of at least 80,000 pounds inch$^2$ per pound of aircraft gross weight and blade weights of sufficient size to store a minimum of 100 foot pounds of rotational kinetic energy per pound of gross weight of the gyroplane while the rotor blade pitch is set to minimum lift during blade prerotation. Then a clutch driving the rotor is disengaged and the rotor blade pitch is changed to a lift condition to enable the gyroplane to climb to an altitude of at least fifty feet. The speed and thrust of a propeller is increased to achieve an increasing a horizontal velocity to maintain altitude, first with the rotor blade providing most of the lift and until the wings provide all the lift. To maximize velocity an improved flight control method is utilized. With this method, the angle of attack of the rotor disc is decreased and the pitch of the rotor blade is reduced to decrease rotor blade rotational speed to minimize drag during flight. During horizontal flight while the rotor blade is loaded, the wing is maintained at a constant angle of attack and the horizontal stabilizer is fixed and does not move. (It's angle of attack stays at generally zero degrees.) After the blade is unloaded during horizontal flight, the angle of attack of the rotor disc and the horizontal stabilizer are kept parallel to each other and maintained generally at a zero angle of attack.

24 Claims, 6 Drawing Sheets

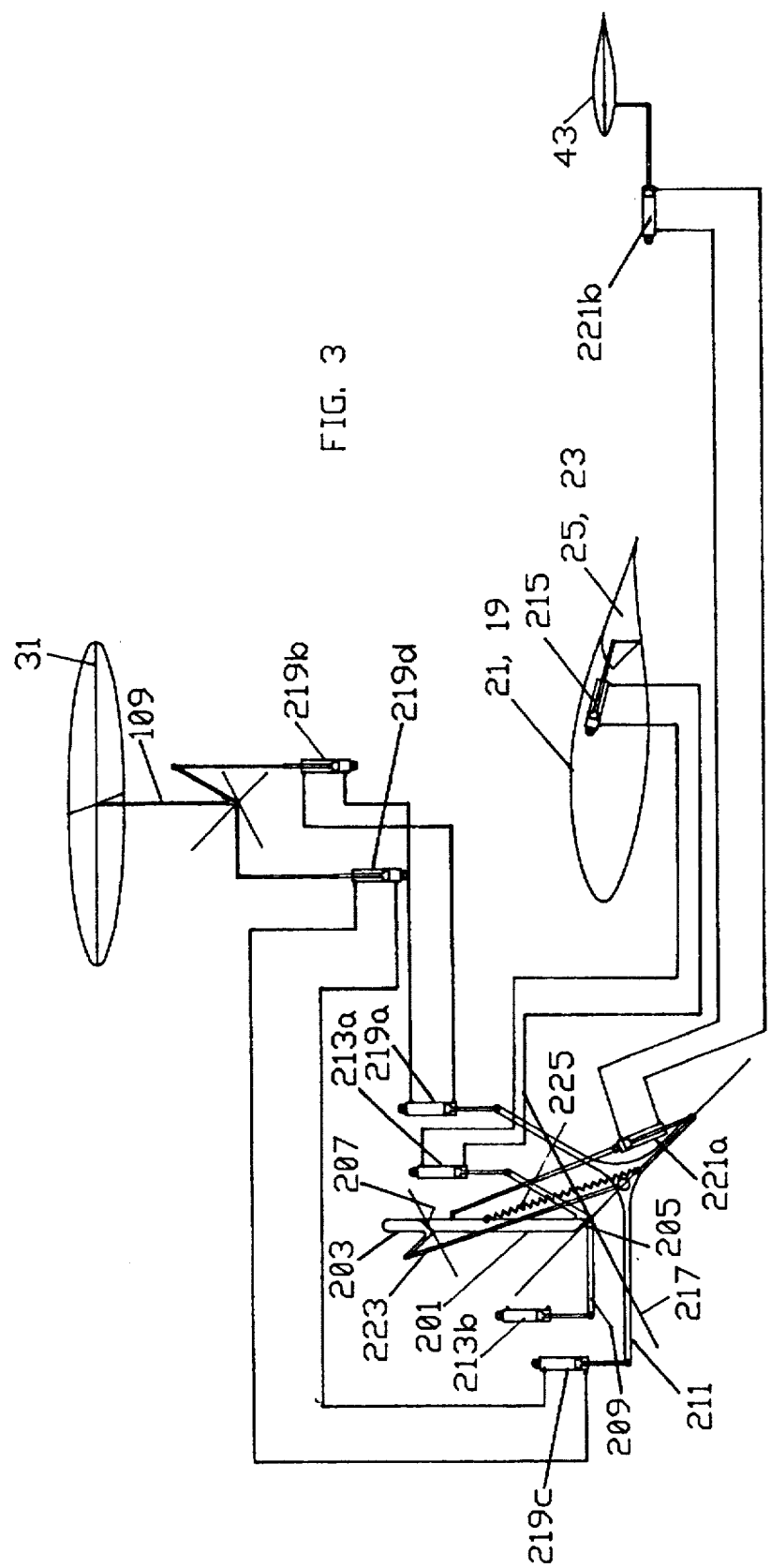

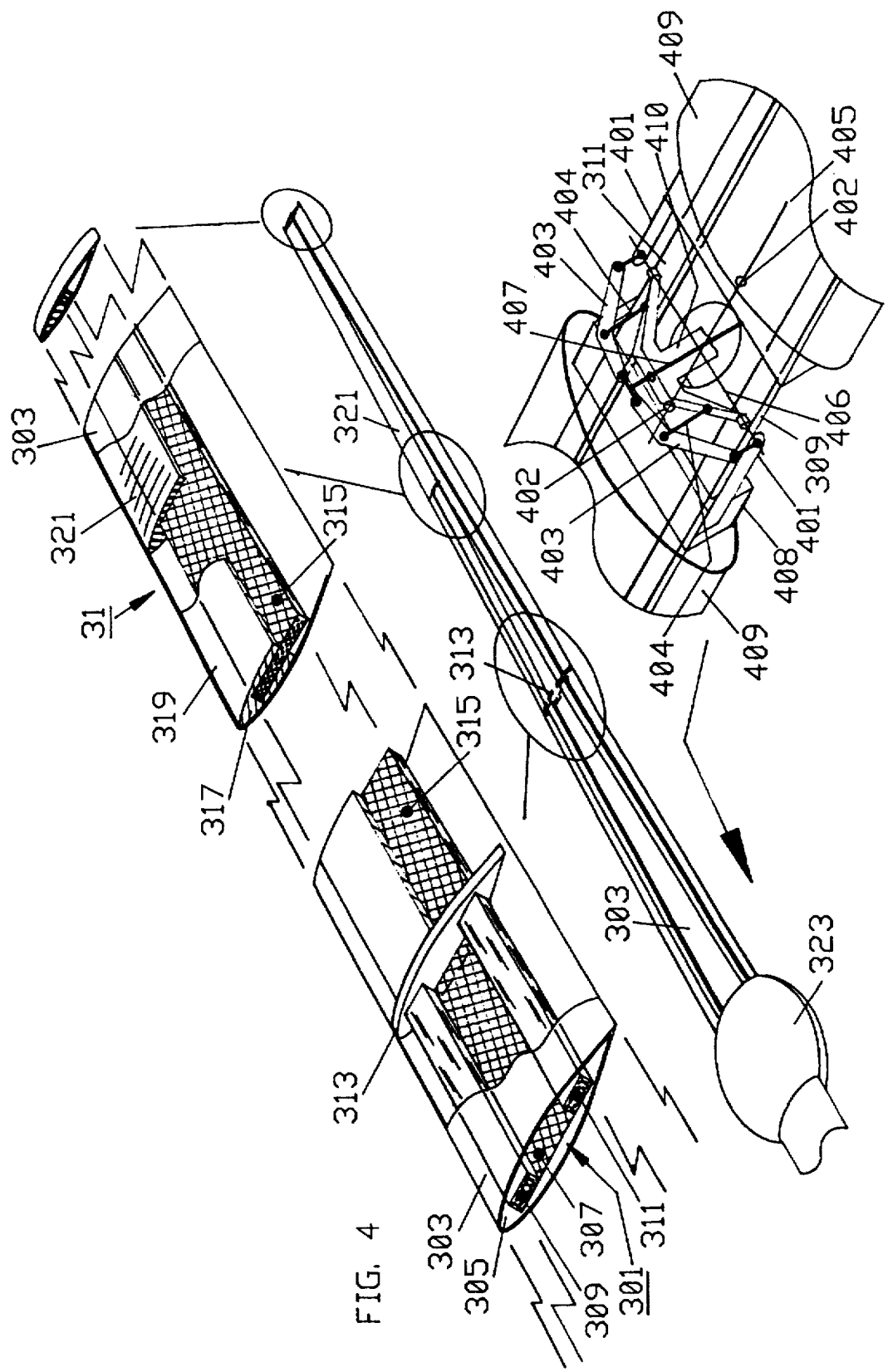

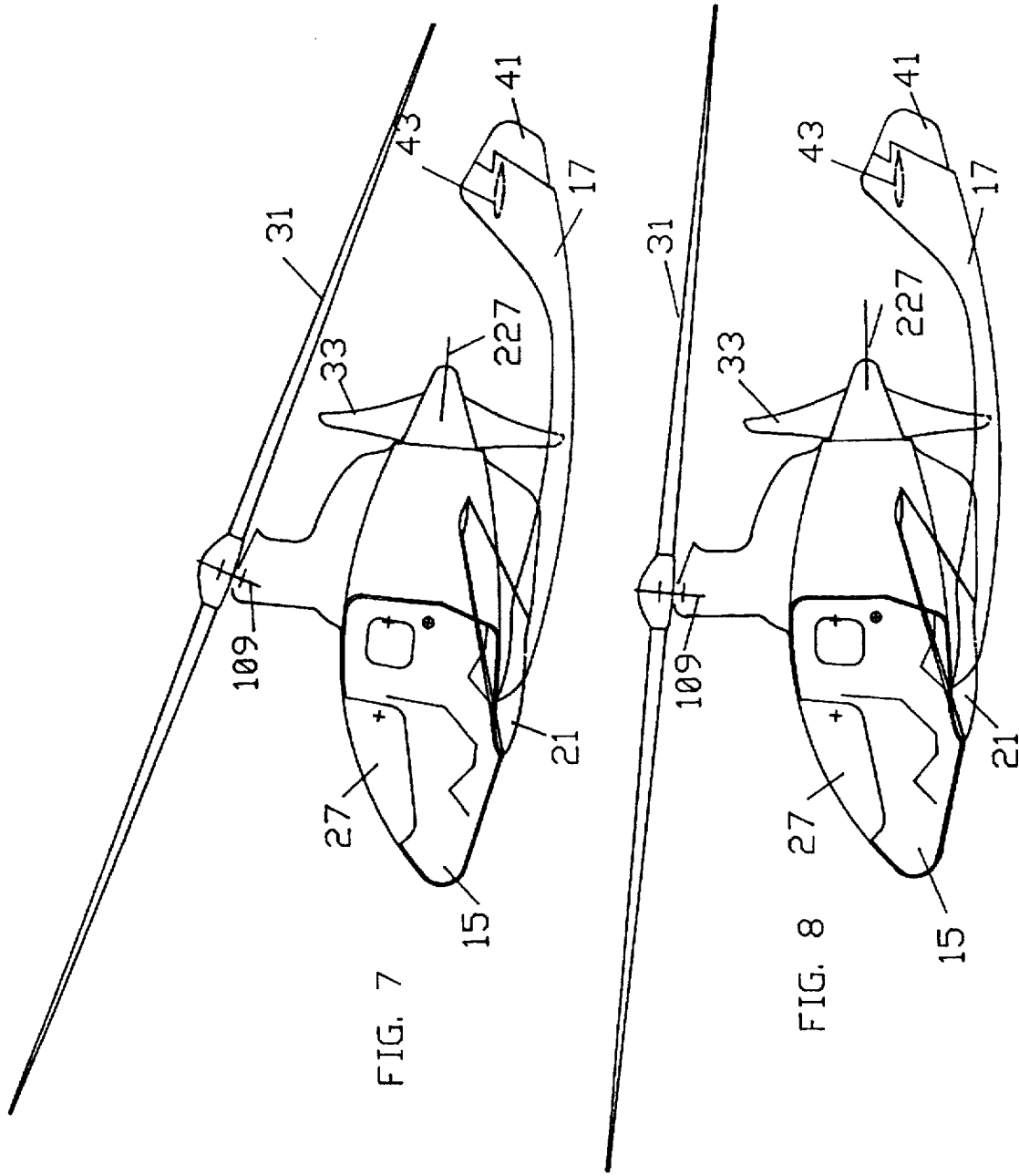

GYROPLANE

BACKGROUND OF THE INVENTION

1. Field of the Invention

This invention relates to a novel methods and apparatus for improving the performance of the aircraft known as the gyroplane.

2. Background

There are two types of heavier-than-air aircraft that achieve lift by movement through the air: (1) The airplane, which has stationary wings that create lift when propelled through the air by a thrust mechanism such as a propeller or jet engine, and (2) the rotorcraft or rotary wing aircraft in which blades rotate to describe a disc above the aircraft to create lift.

There are three types of rotorcraft that utilize a rotor blade to provide lift: (a) The helicopter, in which the rotor blade provides vertical thrust and, because the rotor disc can be tilted on a supporting and rotating vertical mast, a horizontal thrust component. (b) The autogyro, in which lift is provided by a rotary wing and forward thrust provided by a propeller. Auto rotation is achieved by tilting the rotor disc back relative to the airflow so that some air flows up between the blades and through the rotor disc rather than down through the rotor disc as in a helicopter. As the air flows up through the rotor disc, the rotor is driven much like a windmill is driven by the wind. (c) The gyroplane in which a rotor is used for vertical and slow speed flight, but at high speed cruising the rotor is completely unloaded (no lift) and the wing provides all the lift. The gyroplane holds promise as a high-speed, low disc loading rotorcraft.

The quest for a high-speed low disc loading rotorcraft with cruise performance equaling or exceeding airplanes has been ongoing ever since the invention of the autogyro by Juan de la Cierva in Spain in 1923. This led to successful autogyros being produced in England and by several companies in the U.S., with Pitcairn being the most notable source. In the 1930's autogyro technology was rapidly advancing and its safety and utility was being demonstrated and accepted. Mail carrying autogyros operated off of the top of the Philadelphia Post Office. Four and five place autogyros were being produced as well as smaller ones. Pitcairn alone developed and manufactured 14 models between 1930 and 1940. These aircraft had performance equaling contemporary airplanes with maximum speeds up to 150 mph.

The technology developed for the autogyro solved the rotor flapping and control problems for the helicopter and lead to its successful development starting in the late 1930's and continuing to this day. All concepts for a high-speed rotorcraft involve some rotor unloading in cruise flight. In fact, the English Frairey Rotodyne, with its tip jet autorotating rotor, used for take off and landing, set a closed course speed record for rotorcraft of 191 mph in 1959. This speed record was first broken by the Russian Kamov KA-22 in 1961 with a speed of 221 mph. In the U.S. in 1956 the McDonnell XV-1 tip jet compound autogyro reached an unofficial speed of 200 mph. Throughout the 1960's, 1970's, 1980's and still today, slowed and stopped rotor concepts were researched by Bell Helicopter, McDonnell Douglas (Hughes) and Sikorsky. The X-wing stopped rotor concept pursued by Sikorsky, DARPA and NASA received the greatest technology development of any, but was cancelled because of its extreme complexity when it was being readied to start flight development testing.

A slowed or even a stopped rotor high-speed rotorcraft need not be complex. This is attested by the fact that the Herrick 2-bladed stop-rotor autogyro made rotor stops and starts in flight in 1937. However, to achieve the highest speed flight with a gyroplane it will be necessary to unload the rotor during horizontal flight by reducing lift to as close to zero as practicable. An identification of this goal is disclosed in the patent issued to The Ryan Aeronautical Company, U.S. Pat. No. 3,155,341, Nov. 3, 1964. Yet, the potential of the gyroplane remains largely unrealized, and its development stunted by a shift in the interest of the aircraft industry to other goals.

SUMMARY OF THE INVENTION

It is the general object of the invention to provide an improved gyroplane capable of achieving greater speeds and higher altitudes.

In general, this object is achieved with an improved rotor blade with an edgewise stiffness (EI) of at least 80,000 pounds inch$^2$ per pound of aircraft gross weight and blade weights of sufficient size to store a minimum of 100 foot pounds rotational kinetic energy per pound of gross weight of the gyroplane while the rotor blade pitch is set to minimum lift during blade prerotation. Then a clutch in the rotor drive system is disengaged, and the rotor blade pitch is changed to a lift condition to enable the gyroplane to climb to an altitude of at least fifty feet. The speed and thrust of a propeller is increased to achieve an increasing horizontal velocity to maintain altitude, first with the rotor blade providing most of the lift and until the wings provide all the lift. To maximize velocity an improved flight control method is utilized. With this method, the angle of attack of the rotor disc is decreased and the pitch of the rotor blade relative to the rotor disc is reduced to zero to minimize drag during flight. During horizontal flight while the rotor blade is loaded, and until a speed is reached where the rotor can be unloaded, the wing is maintained at a constant angle of attack relative to the horizontal stabilizer, which is fixed and does not move. After the blade is unloaded, the angle of attack of the rotor disc and the horizontal stabilizer are kept parallel to each other and maintained generally at a zero angle of attack.

The above as well as additional objects, features, and advantages of the invention will become apparent in the following detailed description.

BRIEF DESCRIPTION OF THE DRAWINGS

FIG. 3 is a schematic diagram that illustrates a control method or system used to implement the invention.

FIG. 4 is a perspective view, partially fragmented and with components exploded, to illustrate details of the preferred embodiment of the rotor blade.

FIG. 5 is a perspective view of the rotor blade of FIG. 4.

FIG. 6 is a fragmentary perspective view with portions broken away, to illustrate the preferred pitch control mechanism.

FIG. 7 through FIG. 11 are side elevational views of the gyroplane of FIG. 1 to illustrate the position of the rotor disc and elevator in various flight conditions.

DETAILED DESCRIPTION OF THE PREFERRED EMBODIMENT

Figure 1:
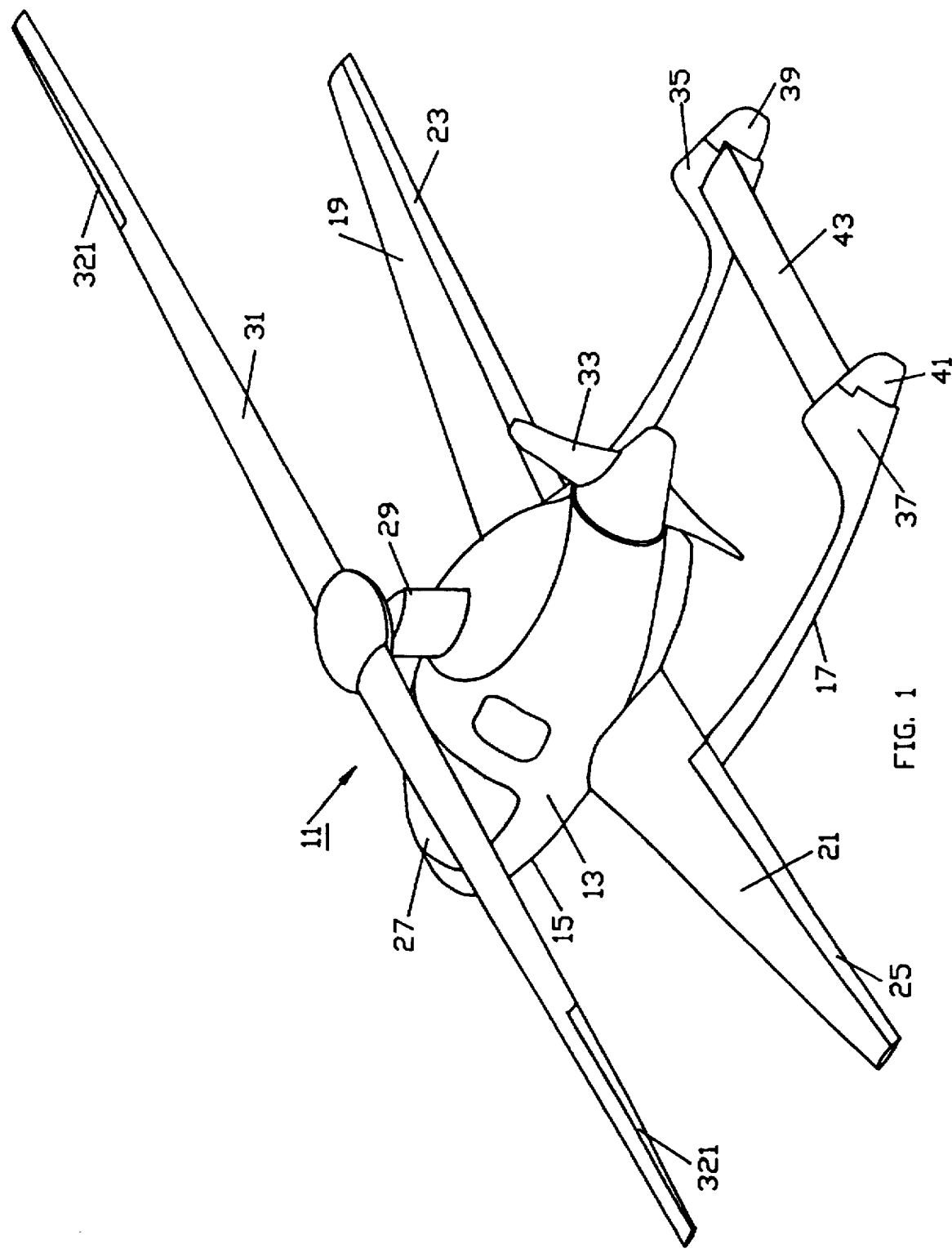
FIG. 1 is a perspective view that illustrates a gyroplane embodying the principles of my invention.

Referring now to FIG. 1 of the drawings, the numeral 11 designates a gyroplane constructed according to the principles of my invention. It includes a fuselage 13 having a forward portion 15 and a twin tail rearward portion 17. The forward portion 15 of the fuselage supports a pair of fixed wings 19, 21, each with an aileron 23, 25. The fuselage 13 forward portion 15 also has a wind shield 27 that partially encloses a cockpit (not shown) for a pilot and crew or passengers. Extending upwardly from the fuselage 13 forward portion 15 is a mast that supports a high inertia rotor 31. Mounted aft of the forward portion 15 of fuselage 13 is a propeller 33. The rear portion 17 of the fuselage, on the twin tails, are fins 35, 37, each with a rudder 39, 41. Between the fins 35, 37 is an elevator 43. Though not illustrated in the drawings, the ailerons 23, 25 and rudders 39, 41 are controlled from the cockpit by conventional control means. The rotor blade pitch, rotor disc angle of attack and elevator 43 are controlled as illustrated in FIG. 3 and explained as well subsequently.

Figure 2:
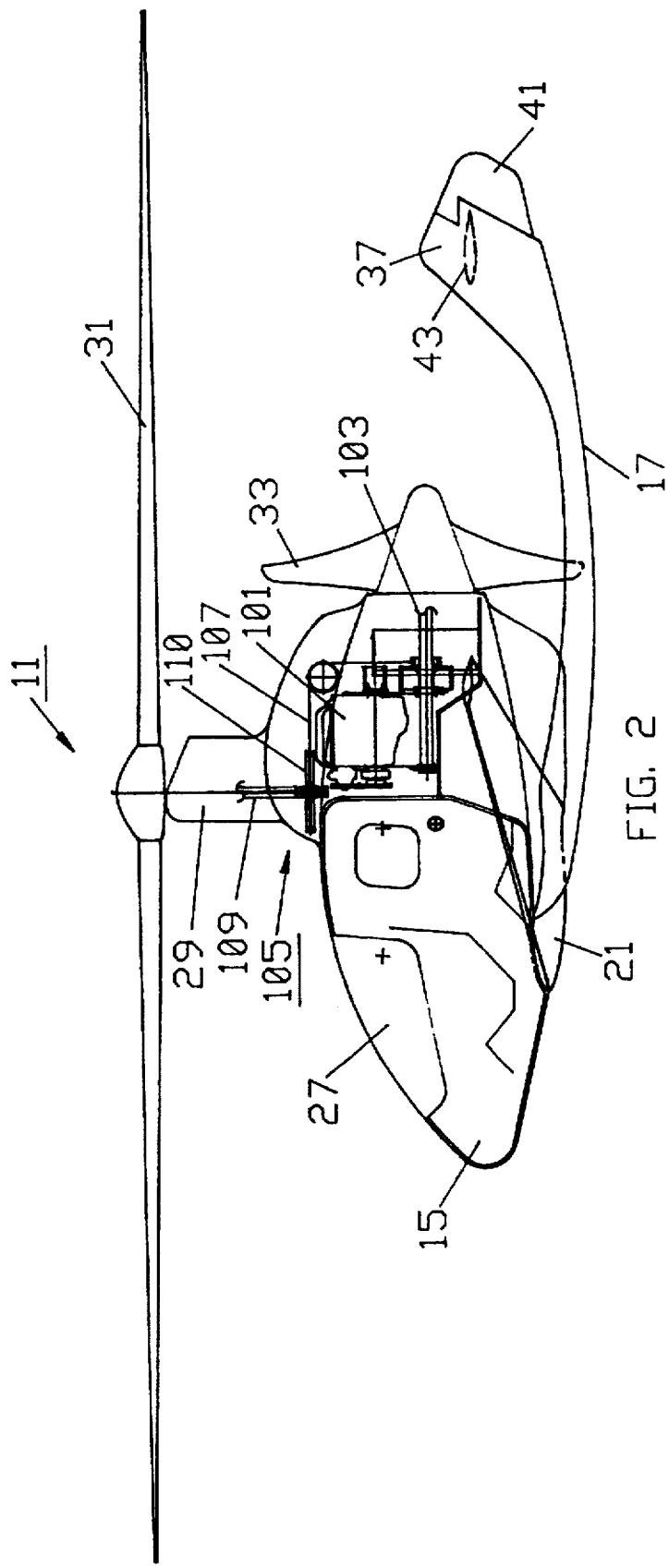
FIG. 2 is a side elevational view of the gyroplane of FIG. 1, with a part of the fuselage broken away to illustrate some of the interior components.

FIG. 2 is a side elevational view of the gyroplane illustrated in FIG. 1, with a part of the fuselage broken away to illustrate the engine 101 and drive shaft 103 used to rotate the propeller 33. The preferred engine is a General Motors 262 cubic inch V-6 developed for the NASCAR racing circuit. Dynometer tested to 450 horsepower before turbo charging. With turbocharging, the engines will develop over 600 horsepower, which drives a 90-inch propeller 33. A clutch and belt-drive mechanism 105 uses a pulley 110 which can be moved horizontally to tighten a belt 107 to rotate a drive shaft 109 to rotate the rotor 31 when the clutch is engaged.

The preferred control mechanism for the gyroplane 11 of FIG. 1 is illustrated schematically in FIG. 3. The primary control stick 201 is of a conventional design with an additional wrist control stick 203 located on its top. The primary control stick 201 has a stop 205 which prevents it from being pushed forward past vertical (it can be pulled back approximately 45 degrees). The wrist control stick 203 has a stop 207 which prevents it from being rotated back relative to the primary stick 201 (it can be rotated forward approximately 45 degrees). At the bottom of the primary control stick 201 are two yokes 209, 211. The first yoke 209 attaches directly to the primary control stick 201 and operates the flaps/ailerons 23, 25 through slave hydraulic cylinders 213, 215. The second yoke 211 is attached to the primary control stick 201 fore and aft pivot pin 217 such that when the primary stick 201 is moved side to side, both yokes 209, 211 move, but yoke 211 can rotate fore and aft independently of the primary control stick 201. The second yoke 211 operates the upper drive shaft/rotor spindle 109 and horizontal stabilizer 43 through slave cylinders 219, 221. The fore and aft movement of the second yoke 211 is controlled by the wrist control stick 203 through push/pull rod 223 such that as the wrist control stick 203 is rotated forward, the push/pull rod 223 causes the second yoke 211 to rotate about pivot pin 217 relative to the first yoke 209. A spring 225 between the primary control stick 201 and the second yoke 211 helps keep the wrist control stick 203 against its stop 207 until the primary control stick 201 has been pushed forward against its stop 205. Thus, spring 225 acts like a detent to let the pilot know the primary control stick 201 is against its stop 205 and a conscious effort is now required to rotate the wrist control stick 203 against the spring 225. A trim (not shown) could be used to balance spring 225.

The linkage/slave cylinders 213, 219 and 221 are set such that when the primary and wrist control sticks 201, 203 are against their stops 205, 207, the horizontal stabilizer 43 holds the wing 19, 21 at the proper angle of attack relative to the airstream for the best lift-to-drag ratio (most efficient flight condition for the aircraft), the flaps 23, 25 are at zero degrees, and the spindle 109 is essentially perpendicular to the horizontal stabilizer 43. The relationship of spindle 109, horizontal stabilizer 43 and wings 19, 21 are shown in five different modes of operation in FIGS. 7–11.

FIG. 7 shows the gyroplane 11 at the slowest speed flight, with the rotor 31 providing most of the lift. Note the rotor spindle 109 is tilted back approximately sixteen degrees relative to the aircraft/propeller centerline 227, the flaps 23, 25 shown in FIG. 3 would be lowered the maximum amount and the horizontal stabilizer 43 is parallel to the aircraft/propeller centerline 227. Since the aircraft center of gravity (C.G.) is located as close as possible to the center of lift of both the rotor 31 and the wing 21, the horizontal stabilizer 43 only has to produce enough lift to counter any moment caused by the lift not passing through the C.G. and as such will have nearly a zero degree angle of attack relative to the airstream. Therefore, the horizontal stabilizer 43 controls the pitch of the aircraft relative to the airstream. An exception to this statement is the case of slowest speed flight where the combination of high rotor drag and low dynamic pressure on the horizontal stabilizer results in the aircraft pitching up until the aircraft weight and other forces (moments) acting on the aircraft are in equilibrium.

FIG. 8 shows the gyroplane 11 in a higher speed mode than FIG. 7, where both the rotor 31 and wing 21 are sharing the lift. The primary control stick 201, flaps 25 and rotor spindle 109 are not tilted back as far, the horizontal stabilizer 43 is still parallel to the aircraft/propeller centerline 227 and has not changed relative to the angle of the wing, but the horizontal stabilizer, with the higher airspeed and dynamic pressure, should be nearly parallel to the airstream causing the wing to be at its optimum angle of attack for best L/D.

Figure 9:
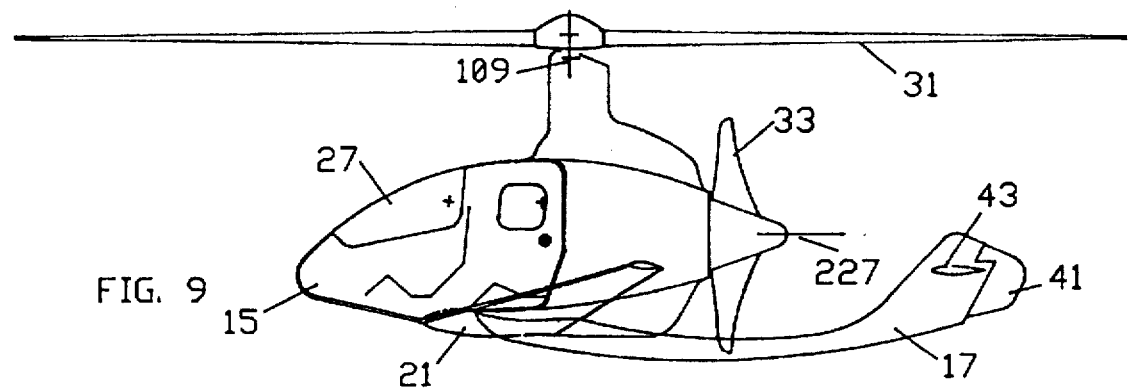

FIG. 9 represents the condition as shown by the control stick schematic with the aircraft at best L/D (most efficient cruise). Here, the primary control stick 201 would be against its forward stop 205, the flaps 25 at the zero angle of attack and the rotor spindle 109 essentially perpendicular to the aircraft slipstream such that it is producing essentially no lift. Now the rotor 31 can and will turn at a low rpm. Should the rotor 31 at essentially zero lift turn too slow to remain stable, the rotor spindle 109 would be tilted back enough to obtain the desired rpm.

Figure 10:
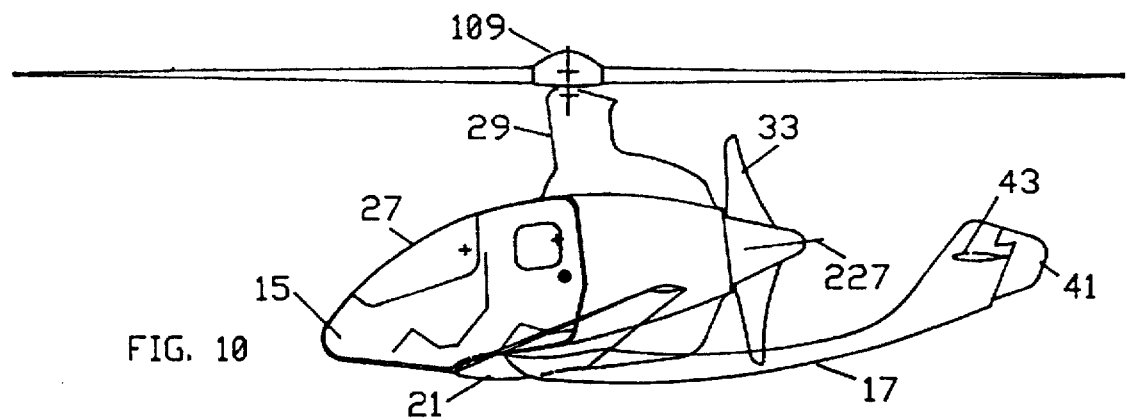
Figure 11:
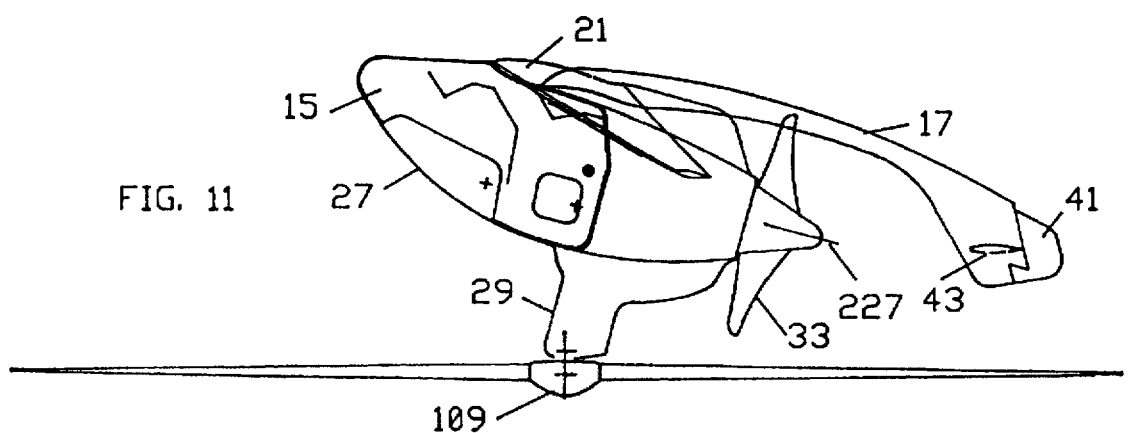

FIG. 10 shows the aircraft in a higher speed condition than shown in FIG. 9. The wrist control stick would be rotated forward, the flaps 25 would be at zero angle of attack and the horizontal stabilizer 43 rotated relative to the aircraft centerline, forcing the aircraft and wing to pitch over, reducing the wing angle of attack so the aircraft can fly faster without producing more lift than necessary to maintain level flight.

To provide vertical take-off and landing capability, a very high rotor inertia is required, necessitating a rotor blade with a very high edgewise stiffness. The preferred embodiment of this rotor blade has an edgewise stiffness (EI) of at least 80,000 pounds inch$^2$ per pound of aircraft gross weight and is illustrated in FIGS. 4, 5, and 6. An EI of 280,000 pounds inch$^2$ per pound of aircraft gross weight has been achieved using the rotor construction of FIGS. 4–6. Here, the rotor 31 is constructed in general with the technology disclosed in U.S. Pat. No. 4,366,387, "Wind-Driven Generator Apparatus and Method of Making Blade Supports Therefor", Dec. 28, 1982. The preferred rotor 31 has a spar 301 inside an airfoil or skin 303 and extends from one blade tip to the other blade tip, passing freely through a hollow inboard portion 305, to allow twisting for pitch changes and bending for coning changes.

As shown in FIG. 4, the spar 301 is preferably a tapered I beam member having a web 307 connected by fore and aft flanges of unidirectional carbon fibers designated respectively 309 and 311. Though FIG. 4 shows only a portion of the rotor blade 31, it is unitary or continuous, with the I beam and its fore and aft flanges 309, 311 extending through the center of the blade as indicated in FIG. 6. This is a departure from the construction used in the wind-driven blade disclosed in U.S. Pat. No. 4,366,387. This unitary or continuous construction is advantageous in eliminating connection means at the center of two blade halves, thus simplifying construction and adding much-needed strength and edgewise stiffness to this high inertia rotor.

The web 307 is a composite material made by laminating ±45 degree layers of cloth containing carbon fibers and epoxy resin. Outboard of rib 313, another web 315, similar in construction to web 307, is bonded to the tips of spar flanges 307, 311 to form a rectangle box spar.

Outboard of rib 313, the spar 301 is bonded/attached to the blade skins 303 with an epoxy microsphere mix 319. The skin 303 is made of layers of unidirectional and ±45 degree carbon fibers as required to carry the appropriate loads. In the outboard section of each blade is an inertia weight 321, which is specially formed in the preferred blade-tip shape with a hollow interior portion to receive the spar 301 to which it is bonded. Each weight 321 weighs 50 pounds and is preferably of spent uranium because of its high density.

Concealed by a rotor spinner 323 is the rotor blade pitch control mechanism as shown in FIG. 6. This mechanism utilizes a pitch horn 401 and a spherical bearing 402 along with collective rocker arms 403 connected to the push/pull rod 407 and blade pitch horn 401. The numeral 405 designates the spar/blade twist axis, while the numeral 406 designates the blade teetering axis. As the push/pull rod 407 is moved up and down, the rocker arms 403 pivot about the rocker arm support fork 404, raising and lowering the blade pitch horn 401, causing the blade to rotate about the spherical bearing 402 and the blade spar/twist axis 405. The collective push/pull rod 407 operates through the rotor spindle 410. This mechanism is operated by a pilot from the cockpit to vary the pitch of the rotor blade 31 from essentially zero during maximum speed horizontal flight to the pitch required for maximum lift during take-off.

In operation the rotor 31 is used for vertical and slow speed flight, but at high speed cruise it is essentially unloaded (no lift), with the wing 19 providing all the lift. When the rotor 31 does not provide any lift, there is no unbalance in lift between the advancing and retreating blade, thus the rotor 31 can be slowed down (to 125 rpm or less), greatly reducing its drag. The conditions that keep a helicopter or an autogyro from going very fast (i.e., too high tip speed on the advancing blade and blade stall on the retreating blade) are eliminated. Note that these conditions occur because the retreating blade must produce the same lift moments about the teetering axis 406 as the advancing blade. Since the air velocities are different between the advancing and retreating blades, the blade pitch must change as the blade rotates to keep the blade lift constant. At an aircraft speed where the blade pitch on the retreating blade is near stall to keep the lift constant, the only way to go faster is to increase the rotor rpm/tip speed which in turn causes the air speed over the advancing and retreating blade to increase. At some point the air speed over the advancing blade approaches the speed of sound, with a dramatic increase in drag.

Because of the lower rotor rpm and corresponding low blade tip speeds, forward speeds of 400 mph are possible with the gyroplane 11 of FIG. 1, while helicopters and autogyros generally fly at speeds less than 200 mph. The official world speed record for the helicopter is less than 250 mph and for the pure autogyro (not powered at any time during flight), it is less than 125 mph. The autogyro can theoretically fly faster than the helicopter because the rotor does not have to provide both lift and thrust, but since there as been little development on the pure autogyro in the past 50 years, its maximum speed is less than that of the helicopter.

Since the wings 19,21 do not have to provide the lift for relatively low landing speeds, they are much smaller (on the order of ¼ to ⅛ the size) than a comparable size fixed wing aircraft with a significant reduction in drag. The resulting total profile drag of the aircraft's lifting surfaces (rotor and wing) is less than for a comparable fixed wing aircraft, which potentially results in a higher speed for the same horsepower. The rotor 31 is not stopped because at some point as it slows down there is not enough centrifugal force to keep it stable. The extra large inertia weight 321 added to each tip of the rotor 31 allows the rpm to be reduced even more.

To provide vertical take-off and landing capability, a very high rotor 31 inertia is required. This inertia is achieved in part by allowing the rotor 31 to overspin at over twice its normal low speed flight rpm. To further increase the inertia, weights 321 of preferably spent uranium are added to the blade. Using as a baseline an aircraft with a 32 ft. span, 65 sq. ft. wing area, 32 ft. rotor diameter, 1000 lb. empty wt. and 2500 lb. gross wt., 50 lbs. of weight is added to each blade for a total of 100 pounds per rotor. While this weight may seem to be a penalty, to achieve the same lifting capacity from a helicopter with its continuous duty gearbox and tail rotor would require not only a significantly heavier weight, but more complexity. For vertical take-off, the rotor 31 is spun to an overspeed rpm of 550 with the rotor pitch set at zero (zero lift). Since the aircraft is still on the ground, no tail rotor is needed to counteract the torque going to the rotor. Also since the rotor 31 is not producing any lift at this point, the horsepower requirements are reduced and this feature plus the short time required for prerotation allow for a very lightweight reduction system. Safety is also assured because the rotor 31 is never powered in flight, only during preflight rotation so if the reduction system should fail, the aircraft is already on the ground. When the rotor 31 is up to speed and the pilot is ready to take off, the first thing to happen before rotor blade pitch is increased is for the prerotator clutch 105 to disengage so torque is removed from the rotor 31. This feature is necessary to keep the aircraft from starting to rotate in the yaw direction as it leaves the ground. With the combination of high rotor rpm and blade weight, the rotor 31 has enough inertia energy to store at least 100 foot pounds per pound of gross weight to lift the 2500 pound aircraft 50 feet in the air and with the assistance of the thrust from the propeller 103 accelerate to 50 mph in 4 seconds. The pusher propeller 103 provides forward thrust so as the rotor rpm slows down, the rotor disc is tilted back allowing some air to now flow through the rotor 31 from the under side to drive the rotor and allow the rotor to provide lift at low forward speed conditions.

The difficulty in achieving a very high rotor blade inertia (high rpm and blade weight) is significant because it requires an extremely high edgewise blade stiffness (EI), on the order of 80,000 pounds in$^2$ per pound of aircraft gross weight. The first edgewise natural frequency of the rotor blade must be greater than the highest rpm the rotor 31 will experience (approximately 10% greater). In the case where the maximum rotor rpm of 550 occurs during preflight rotation, the first edgewise frequency should be at least 600 CPM. The effect of adding weight to the blade is to reduce the rotor natural frequency. The most efficient location of weight would be at the very tip, but because of volume constraints the weight is located in the outboard 5 feet. To achieve a very high rotor blade inertia requires such a high edgewise stiffness as to be impossible to achieve by any present helicopter hub and pitch change mechanism. The natural frequency of the rotor increases with the square root of the increase in edgewise stiffness; for example to double the rotor natural frequency would require a fourfold increase in edgewise stiffness. A combination of very high edgewise stiffness with pitch change has been achieved by utilizing an I beam shaped spar 315 as wide as possible. To allow for a wide spar 315, the blade chord width is tapered with the wide end at the blade root. An I beam is inherently torsionally soft relative to its stiffness. Therefore, this spar configuration can be designed to have a very high edgewise stiffness for a high edgewise natural frequency, a relatively low flatwise stiffness to allow the rotor blade to cone without producing high stresses and a low torsional stiffness so 6.5 ft. of the spar can twist in the hollow root section or inboard portion 305 of the rotor 31 to allow for up to 10 degrees of blade pitch change. This I beam spar 315 eliminates conventional hub bearings which would have to carry the centrifugal loads, provides for pitch changes and produces the needed edgewise stiffness. To reduce weight, improve reliability and increase stiffness, the spar 315 is made continuous through the hub 323. To further increase the edgewise stiffness and lower the torsional stiffness, the spar 315 is made of high modulus unidirectional carbon fibers. Since the unidirectional carbon fibers run spanwise, they do not contribute to the torsional stiffness which is driven primarily by the cross sectional shape of the spar cap and the shear modulus of the epoxy resin.

In order to slow the rotor 31 down so high speed forward flight is obtainable, it must be designed so that it will not flutter either when the airflow first sees the leading edge of the rotor as it is advanced into the airflow or 180 degrees later when the airflow first sees the entire trailing edge length of the rotor as it moves in the direction of the airflow. The airflow will pass over the entire length of the trailing edge first if the rotor tip speed is less than the aircraft's forward speed. It is possible for the rotor tip speed to be as low as ⅓ of the aircraft's forward speed. For normal helicopter and auto gyro design, the rotor tip speed is generally more than 2.0 times the aircraft speed. Flutter can be controlled if the rotor center of lift is designed to pass through the rotor center of gravity (C.G.) or with a torsionally stiff rotor. The rotor center of lift is located at approximately ¼ of the rotor width or chord from the rotor edge that first experiences the airflow. In the case where the air flows over both the leading and trailing edges, it is impossible for the center of lift which is always varying to pass through the rotor C.G., therefore the rotor will have a much greater flutter potential than either a gyrocopter or helicopter rotor which predominately has the air pass over the leading edge first. To overcome this potential flutter problem, the C.G. must be placed where the flutter potential is the same as when the highest velocity air flows over the leading edge of the rotor as when the highest velocity air flows over the trailing edge. The maximum prerotate rpm and the maximum forward speed of the aircraft at the minimum rotor rpm establish the maximum air speeds seen by the rotor over the leading and trailing edge.

Under these conditions, the optimum C.G. location should be placed approximately 29% of the chord from the rotor leading edge. Since the rotor center of lift cannot always pass through the rotor C.G. under all operating conditions, the rotor must be made torsionally very stiff to avoid flutter. This stiffness is achieved by designing the rotor with chord taper and a rotor thickness that is much greater at the root than at the tip so the torsionally efficiency improves from the tip to the root. Note that for a given skin thickness, the torsional stiffness increase with the square of the rotor cross sectional area. Therefore, as the rotor cross sectional area increases toward the rotor root, the torsional stiffness increases dramatically. The rotor thickness to rotor chord needs to be approximately 10% at the tip to minimize drag at high rotor tip speeds, but can be as high as 35% at the rotor root without an appreciable change in rotor drag. To further improve torsional stiffness, the rotor skin is made up of plus and minus 45 degree high modulus carbon fiber.

To unload the rotor 31, which can start as soon as there is forward speed on the aircraft and air flow over the wing, the rotor blade pitch relative to the rotor plane of rotation (rotor disc) is first reduced to zero. The resultant angle of attack on the rotor, however, is not zero so long as the rotor disc is tilted back relative to the incoming airflow. As the aircraft forward speed is increased and the wing produces more lift, the rotor disc is tilted forward to where it is almost parallel to the airflow when the wing is producing 100% of the aircraft lift. The rotor disc is only tilted back enough to maintain the desired rotor rpm. If the rotor disc is tilted forward until it is parallel to the airflow, the airflow through the rotor becomes zero and thus eliminates the driving force needed to keep the rotor turning. The rotor rpm could then slow down until there is not enough centrifugal force to keep the rotor 31 stable with disastrous results. Should the rotor disc be tilted forward past where it was parallel to the airflow (air now passes through the rotor from the top side), the rotor will again speed up, only now the rotor will produce a negative lift which the wing must overcome to maintain level flight. The angle of the rotor disc relative to the airflow is very important in keeping the rotor at its desired rpm. In order to achieve this goal easily and safely, the following control philosophy is followed. Up until the rotor disc is tilted forward enough to cause the rotor rpm to drop to its desired rpm, the horizontal stabilizer 43 is fixed and does not move. Thereafter, the horizontal stabilizer 43 and rotor disc move together such that the angle between the horizontal stabilizer 43 and the rotor disc remains constant. Since the horizontal stabilizer 43 angle to the slipstream is basically constant, the rotor disc angle relative to the slipstream will also remain constant keeping the rotor rpm near its desired rpm.

The control stick 201 controls the angle of the rotor disc by changing the angle of the rotor spindle 109. With a teetering rotor hub, the rotor disc will try to stay perpendicular to the rotor spindle 109. The control stick 201 has a detent interconnected to the linkage controlling the horizontal stabilizer which prevents the rotor disc from being tilted too far forward before the horizontal stabilizer starts to move. Trim adjustment changes the angle relationship between the horizontal stabilizer and the rotor disc. The trim may be manual, or automatic with an rpm feedback servo. In either case for safety, a low speed rotor rpm alarm is used. The horsepower required (from the airflow through the rotor) to turn the rotor is approximately a function of rotor rpm cubed, therefore the rpm is inherently stable and requires only minor trim adjustments in the spindle position to keep the rpm at its optimum. The trim adjustments are minor because the horizontal stabilizer keeps the airflow angle across the rotor plane constant.

The pilot operates the push/pull rod 407 and the control stick 201 in the following manner. During rotor prerotation (prior to flight), the push/pull rod 407 has the blade in its inherent zero pitch position and the control stick 210 is forward to its most efficient flight position detent. Once the rotor 31 is at the desired jump take-off rpm, the rotor clutch 105 is disengaged as the push/pull rod 407 is lowered to increase rotor pitch to lift the aircraft off the ground. The control stick 201 is held forward for minimum forward drag so the aircraft propeller 33 can accelerate the aircraft as fast as possible. Once the push/pull rod 407 has been lowered to the maximum rotor pitch position (controlled with stops), the rotor stick is pulled back which increases the airflow through the rotor and keeps the rotor rpm and lift up as necessary. The push/pull rod 407 controls the rotor pitch and the amount of lift provided by the rotor 31 while its inertia is being used up. Maximum climb angle is obtained at full engine throttle by a combination of quickly pulling collective and tilting the rotor back. Best rate of climb, however, is obtained once the rotor 31 is unloaded and the wing provides all the lift at its best lift to drag angle of attack (most efficient flight condition). To achieve this flight condition most quickly, the pilot pulls collective as required to clear the ground while the aircraft accelerates in level flight. Once the collective stick is raised all the way up, the control stick is pulled back as required to continue level flight. As the aircraft continues to accelerate in level flight, the collective is allowed to return to zero pitch and then the control stick is pushed forward until it is against its most efficient flight position detent. At this point the aircraft is flying at its most efficient speed, which also closely corresponds to the speed for best climb. This speed will vary depending upon the aircraft weight and the density altitude. In effect the wing is made to always operate at its best lift to drag condition which occurs at a given wing angle of attack. This optimum angle of attack is established by the relationship between the wing and horizontal stabilizer zero lift line and is held constant until the control stick is pushed forward past the most efficient flight position detent. This feature of mechanically knowing exactly what the most efficient flying speed is, is not present on other aircraft.

Once the aircraft has reached this most efficient flight speed, the pilot has several options. 1) If he wishes to fly faster without climbing, he must reduce the wing coefficient of lift so the overall wing lift (equal to aircraft weight) can stay constant as the airspeed increases. The change required in lift coefficient "CL" is apparent from the following formula for lift. L=0.5×P×V××2×CL×A, where L=lift, P=air density, V=air velocity and A=wing area. The coefficient of lift can be changed by moving the horizontal stabilizer and the pitch of the aircraft but with a reduction in wing efficiency (increase in drag for a given lift). Now as the pilot flies faster, the drag increases with the square and the hp increases with the cube of the speed ratio increase with a resulting fuel efficiency (miles per gallon) decrease. 2) If he wishes not to climb and continue to fly at the most efficient speed, he must reduce the engine hp and corresponding thrust until thrust equals drag. 3) If he wishes to fly faster yet still maintain the same fuel efficiency, he must first climb with the stick forward against its most efficient flight position detent. As the aircraft climbs, the air becomes thinner (density "P" is less) forcing the aircraft to fly faster for the given aircraft weight. Since the air is thinner, drag is reduced. The net result is the aircraft flies faster with only a linear increase in hp, such that the aircraft's fuel mileage stays constant. If he keeps climbing, his speed and hp requirements also increase (but fuel efficiency stays constant) until the hp available equals the hp required. As the weight of the aircraft decreases (fuel used up), the hp required to fly at the given altitude decreases. This new found delta hp enables the aircraft to climb until hp equilibrium again occurs. To obtain as much hp as possible at the higher altitudes, we propose to turbocharge the engine so maximum flying speeds can be obtained without sacrificing fuel efficiency. These characteristics of being able to fly faster at higher altitudes are well known, but to have a control system to automatically position the aircraft at its most efficient speed is unique.

It should be apparent from the foregoing that I have created an invention having significant advantages, including those apparent from the above descriptions.

Among the advantages of the gyroplane 11 are the fact that rotor RPM and rotor lift is controlled by tip path control (cyclic) rather than by collective pitch change. Transition from rotary wing lift to fixed wing lift is achieved by maintaining a fixed minimum collective pitch and tilting the shaft spindle forward as aircraft speed increases, thus decreasing the inflow on the rotor with the desired reduction in rotor RPM, lift and blade flapping. Once the desired rotor RPM is achieved, further forward tilt of the rotor shaft relative to the slip stream is not permitted.

Although the invention has been described in only one of its forms, it is not thus limited but is susceptible to various changes and modifications without departing from the spirit thereof.

What is claimed is:

1. A method of flying a gyroplane having a two-bladed rotor, a forward thrust means, a wing, a horizontal stabilizer, and an engine to rotate the rotor blade, comprising the steps of:

providing the rotor with an edgewise stiffness of at least 80,000 pounds inch$^2$ per pound of aircraft gross weight and blade weights to enable rotation at a speed to store a minimum of 100 foot pounds per pound of gross weight;

rotating the rotor at said speed to describe a rotor disc, while the angle of attack of the rotor blades is set to a minimum lift condition;

changing the angle of attack of the rotor blades to a lift condition for vertical climbing;

increasing forward thrust to achieve an increasing horizontal velocity necessary to maintain a selected altitude, first with the rotor providing most of the lift and until the wing provides most of the lift;

reducing the pitch of the rotor disc and the angle of attack of the rotor blades to essentially zero lift to decrease the rotor rotational speed to minimize drag during horizontal flight.

2. The method defined by claim 1 which further comprises the step of:

maintaining generally a constant angle of attack of the wing by maintaining a fixed angle of the horizontal stabilizer relative to the fuselage, until the rotor blade is substantially unloaded during horizontal flight except for slowest flight.

3. The method defined by claim 1, which further comprises:

rotating the rotor blade at said speed to describe a rotor disc, while an engine prerotator clutch is engaged and the angle of attack of the rotor blades is set to a minimum lift condition;

disengaging the engine prerotator clutch and changing the angle of attack of the rotor blades to lift condition for vertical climbing.

4. The method defined by claim 1 further comprising the step of:

maintaining generally a zero angle of attack of the rotor disc and also of the horizontal stabilizer after the rotor blade is substantially unloaded during horizontal flight by controlling the rotor disc and horizontal stabilizer so that each moves together with the other in the same angular direction.

5. A control method for flying a gyroplane having a wing for horizontal flight, a rotor for vertical and horizontal flight and a horizontal stabilizer, comprising the step of:

maintaining generally a constant angle of attack of the wing by maintaining a fixed angle of the horizontal stabilizer relative to the fuselage, until the rotor blade is substantially unloaded during horizontal flight.

6. The method defined by claim 5 wherein the rotation speed of the rotor is controlled by tilting the rotor disc and substantially unloading the rotor during horizontal flight until the air flow over the entire retreating blade passes first over the trailing edge to the leading edge rather than the from the leading edge to the trailing edge.

7. An improved gyroplane having variable pitch rotor with plural blades, a forward thrust means, a wing, a horizontal stabilizer, and an engine to rotate the rotor, the improvement comprising:

the rotor having an edgewise stiffness of at least 80,000 pounds inch$^2$ per pound of aircraft gross weight and blade weights to enable rotation at a speed to store a minimum of 100 foot pounds per pound of gross weight;

the engine being adapted to rotate the rotor at said speed;

flight control means to set the rotor blade angle of attack to a minimum lift condition;

said flight control means being adapted for changing the angle of attack of the rotor blades to a lift condition for vertical climbing;

means to increase thrust to achieve an increasing horizontal velocity necessary to maintain a selected altitude, first with the rotor providing most of the lift and until the wing provides most of the lift;

said flight control means also being adapted to reduce the pitch of the rotor disc and angle of attack of the rotor blades to essentially zero lift to decrease the rotor rotational speed to minimize drag during horizontal flight.

8. The gyroplane defined by claim 7 which further comprises:

said flight control means being adapted to maintain generally a constant angle of attack of the wing by maintaining a fixed angle of the horizontal stabilizer relative to the fuselage, until the rotor is substantially unloaded during horizontal flight.

9. The gyroplane defined by claim 7 which further comprises:

said flight control means being adapted to maintain generally a zero pitch of the rotor disc and a zero angle of attack of the horizontal stabilizer after the rotor is substantially unloaded during horizontal flight by moving the rotor disc and horizontal stabilizer together in the same angular direction.

10. An improved gyroplane having a rotor with variable pitch rotor blades, a forward thrust means, a wing, a horizontal stabilizer, and an engine to rotate the rotor, the improvement comprising:

the rotor having a construction and a weight to enable rotation at a speed to store a minimum of 100 foot pounds of kinetic energy per pound of gross weight;

the engine being adapted to rotate the rotor at said speed;

flight control apparatus to set the rotor blade pitch to a minimum lift condition;

said flight control apparatus being adapted for changing the angle of attack of the rotor blades to a lift condition for vertical climbing;

an engine speed controller to increase engine speed and thrust of forward thrust means to achieve an increasing horizontal velocity necessary to maintain a selected altitude, first with the rotor providing most of the lift and until the wing provides most of the lift;

said flight control apparatus also being adapted to reduce the pitch of the rotor disc and angle of attack of the rotor blades to essentially zero lift to decrease the rotor rotational speed to minimize drag during horizontal flight.

11. The invention defined by claim 10 which further comprises wing tip weights to achieve said kinetic energy.

12. The invention defined by claim 10 which further comprises:

said flight control means being adapted to maintain generally a constant angle of attack of the wing by maintaining a fixed angle of the horizontal stabilizer relative to the fuselage, until the rotor is substantially unloaded during horizontal flight.

13. The invention defined by claim 10, wherein the rotor has an edgewise stiffness of at least 80,000 pounds inch$^2$ per pound of aircraft gross weight.

14. The invention defined by claim 10 which further comprises:

said flight control means being adapted to maintain generally a zero pitch of the rotor disc and a zero angle of attack of the horizontal stabilizer after the rotor is substantially unloaded during horizontal flight by controlling the rotor disc and horizontal stabilizer so that each moves together with the other in the same angular direction.

15. The invention defined by claim 14 wherein said rotor has an edgewise stiffness of at least 80,000 pounds inch$^2$ per pound of aircraft gross weight.

16. The invention defined by claim 10, which further comprises:

the engine being adapted to rotate the rotor at said speed while an engine prerotator clutch is engaged;

flight control apparatus to set the angle of attack of the rotor blades to a minimum lift condition while the engine prerotator clutch is engaged;

said flight control apparatus being adapted for changing the angle of attack of the rotor blades to a lift condition for vertical climbing after the engine prerotator clutch is disengaged.

17. A control method for flying a gyroplane having a wing for horizontal flight, a rotor for vertical and horizontal flight and a horizontal stabilizer, comprising the step of:

maintaining generally a zero pitch of the rotor disc and a zero angle of attack of the horizontal stabilizer after the rotor blade is substantially unloaded during horizontal flight by controlling the rotor disc and horizontal stabilizer so that each moves together with the other in the same angular direction.

18. A method of controlling the rotation speed of a rotor for a gyroplane while flying, the gyroplane having a wing for horizontal flight, a rotor for vertical and horizontal flight and a horizontal stabilizer, the rotating rotor defining a rotor disc, the method comprising the step of:

tilting the rotor disc and substantially unloading the rotor during horizontal flight until the air flow over the entire retreating blade passes first over the trailing edge to the leading edge rather than the from the leading edge to the trailing edge.

19. An improved gyroplane having a rotor, the improvement comprising:

the rotor having a means for storing at least 100 foot pounds of rotational energy per pound of the gross weight of said gyroplane, whereby rotor stability at high forward speeds and low rotor rotation rates is achieved and vertical take-off capabilities are enhanced.

20. The gyroplane of claim 19, wherein:

the gyroplane has a two-bladed rotor, and the rotor has an in-plane stiffness of at least 80,000 pounds-inch$^2$ per pound of gross weight of said gyroplane, whereby blade resonance of the rotor at all rotation rates is prevented.

21. A method of controlling a gyroplane during substantially rotor unloaded flight, comprising:

providing an aerodynamic pitch control surface that is pivotable relative to the fuselage of said gyroplane;

providing a rotor that rotates to define a rotor disc that is pivotable relative to the fuselage of said gyroplane for tilting the rotor disc;

providing pilot control means for simultaneously controlling the angle of the pitch control surface and the tilt of the rotor disc relative to the fuselage of the gyroplane;

controlling the angle of the pitch control surface and the tilt of the rotor disc with the pilot control means so that the pitch control surface and the rotor disc move in the same angular direction and in direct proportion to each other.

22. A method of controlling a gyroplane comprising the steps of:

providing an aerodynamic pitch control surface that is pivotable relative to the fuselage of said gyroplane;

providing a rotor that rotates to define a rotor disc that is pivotable relative to the fuselage of said gyroplane;

providing pilot control means for simultaneously controlling the angle of the pitch control surface and the tilt of the rotor disc relative to the fuselage of the gyroplane; and during substantially rotor unloaded flight, controlling the angle of the pitch control surface and the angle of the rotor disc using the pilot control means so that the pitch control surface and the rotor disc move in the same angular direction and in direct proportion to each other; and during substantially rotor loaded flight, maintaining a generally fixed angle of the pitch control surface relative to the fuselage of the gyroplane.

23. A method of controlling the rotation rate of a gyroplane rotor that rotates to define a rotor disc while the rotor is substantially unloaded, the method comprising:

adjusting the angle of the rotor disc relative to the airstream so that the rotation rate of the rotor is maintained at a desired level.

24. The method of claim 23, wherein:

the angle of the rotor disc relative to the airstream is adjusted by adjusting the angular relationship of the rotor and the horizontal stabilizer.

* * * * *